Nov. 21, 1967  J. MITACEK  3,354,051
APPARATUS FOR PREVENTING FOAMING IN A FRACTIONATOR
Filed Dec. 14, 1964

*INVENTOR*
JOHN MITACEK

BY
*Young & Quigg*
ATTORNEYS

United States Patent Office 3,354,051
Patented Nov. 21, 1967

3,354,051
APPARATUS FOR PREVENTING FOAMING
IN A FRACTIONATOR
John Mitacek, Bartlesville, Okla., assignor to Phillips
Petroleum Company, a corporation of Delaware
Filed Dec. 14, 1964, Ser. No. 418,190
3 Claims. (Cl. 202—153)

ABSTRACT OF THE DISCLOSURE

Foaming of liquid and vapor introduced to the lower section of a fractionation column above the level of liquid in the kettle is avoided by introducing the liquid and vapor tangentially and horizontally onto the inner wall of the column to subject the stream to centrifugation while preventing upward flow of liquid along said wall by positioning a flat ring extending radially inwardly from said wall along which escaping vapor flows to the inner periphery and thence upwardly through the column.

Figure 1:
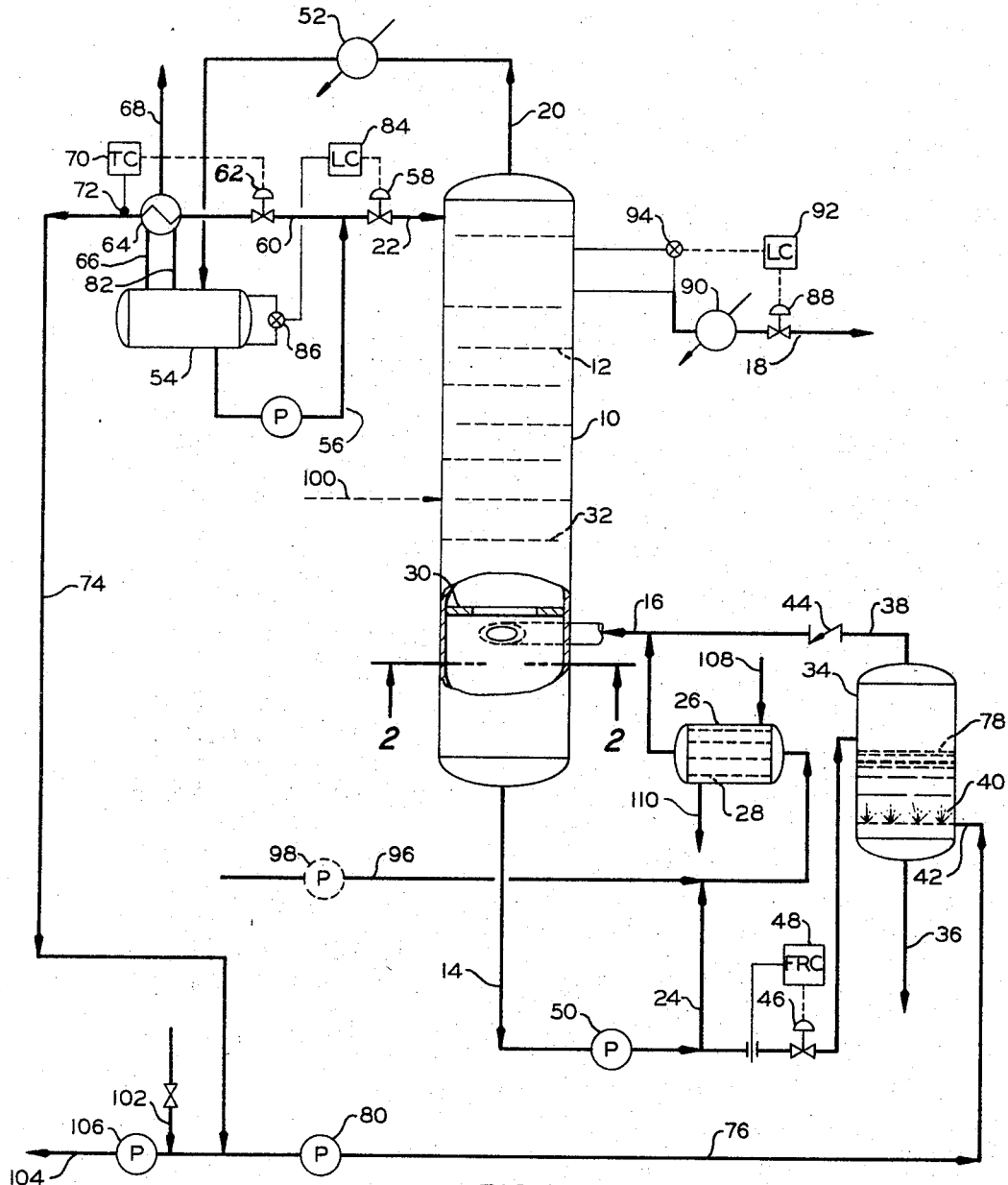

This invention relates to apparatus for preventing foaming of feed and reboiler liquid in the bottom section of a fractional distillation column or fractionator.

This invention is an improvement in the apparatus of the copending application of J. J. Moon entitled, "Preparation of Soluble Polymer and Catalyst Residues for Disposal," Ser. No. 288,711, now patent No. 3,257,372 filed, Oct. 5, 1962, and of the copending application of W. E. Plaster entitled, "Method and Apparatus for Controlling Polymer Deposition in Reboiler," Ser. No. 417,426, filed Dec. 10, 1964.

In the operation disclosed in the aforesaid copending applications, solvent is being recovered from a washings stream from a polymerization process wherein both solid and soluble polymer are produced. The washing agent is the same monomer as used in the polymerization step. This stream of monomer and soluble polymer is fed into a conventional distillation column utilizing an indirect heat exchanger as a reboiler to which a portion of the effluent bottoms stream or kettle product from the fractionator, containing soluble polymer in higher concentration than in the feed stream to the column, is passed thru the tubes of the reboiler and there heated by indirect heat exchange with a heating fluid to provide the reboil vapor to operate the column. One invention involved comprises passing the feed stream to the column thru the reboiler tubes in admixture with the bottoms effluent being circulated as reboil liquid and the reboil vapor and feed are injected into the bottom section of the column in admixture with vapor from a stripping column. This vapor from the stripping column is produced by passing bottoms or kettle product into a stripping vessel and stripping additional olefin from the solution of polymer, utilizing as stripping gas hot olefin taken from the overhead vapor stream from the fractionation column.

The injection of the fresh feed, reboil liquid, and overhead vapor from the stripping vessel has been found to produce a substantial amount of foaming which interferes with proper operation of the fractional distillation column.

The invention is concerned with a method and apparatus for prevention of the foaming of a feed to a fractionator or fractional distillation column when such feed contains a viscous residue and readily vaporizable material which has foaming tendencies.

Accordingly, it is an object of the invention to provide an improved apparatus for prevention of foaming in a fractionating column when the feed and kettle bottoms contain a viscous residue. A further object is to provide a means of preventing foaming of a reboil kettle bottoms stream consisting principally of an olefin containing soluble polymer in solution. Other objects of the invention will become apparent to one skilled in the art upon consideration of the accompanying disclosure.

When a preheated liquid and vapor containing a viscous residue is introduced as a stream into a kettle of a fractionating column, part of the vapor escapes from the liquid and there is not sufficient time to reach equilibrium with the result that vapor is evolved from the remaining liquid and foam is produced. This frequently results in flooding of the column with foam. Cavitation at the pump is also increased because the suction of the pump pulls both vapor and liquid. The invention solves the foaming problem by introducing the reboil liquid tangentially into the fractionating column below the lowermost tray and substantially above the level of liquid in the kettle section of the column and preventing flow of the liquid upwardly along the inner wall of the column. Upward flow is prevented by means of a flat annular ring or plate extending from the wall of the column inwardly a substantial and effective distance to prevent upward flow of liquid but still afford ample space for upward flow of vapor thru the fractionator. In this manner the injected reboil liquid spreads out in a relatively thin stream circulating around the wall of the column below the ring so that centrifuging is effected with inward escape of vapor which is free to pass upwardly thru the opening in the ring. The liquid circulating around the wall of the column is gravitated into the liquid in the kettle and no foaming is effected.

This method and means of operation have also been found to prevent cavitation at the circulating pump in the effluent line from the kettle.

Figure 2:
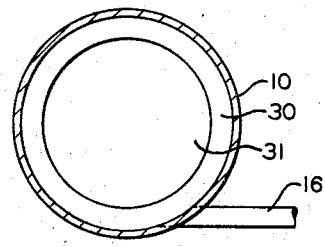

A more complete understanding of the invention may be had by reference to the accompanying schematic drawing of which FIGURE 1 shows an arrangement of apparatus or processes flow in accordance with the invention and FIGURE 2 is a cross section of the fractionating column taken on the line 2—2 of FIGURE 1.

Referring to the drawing, a fractional distillation column 10 is provided with a number of trays 12, a bottom effluent line 14, a reboil liquid feed line 16, a side stream take-off line 18, an overhead vapor line 20, and a reflux inlet line 22. A conduit 24 having reboiler 26 positioned therein, connects bottoms effluent line 14 with reboil liquid feed line 16. Reboiler 26 is provided with the usual heat exchange tubes 28. Line 16 enters the bottom section of column 10 tangentially below ring 30 which is positioned just below the bottom tray 32. The details of the structure with respect to ring 30 are shown more clearly in FIGURE 2 which shows the tangential entry of the feed line 16 for the reboil liquid, including fresh feed and stripped vapor from the stripping vessel. Ring 30 has an outer diameter substantially that of the inner diameter of column 10 and a radial width which is in the range of about $\frac{1}{15}$ to $\frac{4}{15}$ of the inner diameter of the column, and preferably, in the range of $\frac{1}{10}$ to $\frac{1}{5}$ of the column diameter. This provides ample flow capacity for vapor thru aperture 31.

Line 14 connects with stripping vessel 34 which is provided with a bottoms outlet line 36, an overhead vapor line 38, and a sparger or distribution ring 40 connected with vapor or gas inlet line 42. Overhead vapor line 38 connects with reboil liquid feed line 16 and is provided with a check valve 44 for preventing backflow of reboil liquid into the stripping vessel 34. A motor valve 46 in line 14 is operated by flow rate controller 48 which is set to proportion the flow of bottoms liquid between line 24 and line 14 downstream of line 24, thereby controlling the proportion of reboil liquid and liquid passing to disposal thru stripping vessel 34 and line 36. A pump 50 in line 14 upstream of line 24 circulates bottoms liquid thru reboiler 26 and also the divided bottoms stream passing into vessel 34.

Overhead vapor line 20 passes thru a condenser or cooler 52 and into accumulator 54. Conduit 56 connects with the bottom of accumulator 54 and with line 22 just upstream of valve 58. Line 60 contains a motor valve 62 and connects with line 56 for passage of condensed light hydrocarbon thru condenser 64. Vapor from accumulator 54 passes thru line 66 into condenser 64 and the uncondensed gas escapes or is vented thru line 68. Refrigeration or cooling in condenser 64 is provided by reducing the pressure on the fluid in line 60 by cracking valve 62 which is operated by temperature controller 70 which is sensitive to the temperature in line 60 at point 72. This vaporized hydrocarbon from line 60 downstream of valve 62 passes thru lines 74 and 76 into vapor inlet line 42 as stripping gas for bottoms liquid 78 in vessel 34. Pump 80 in line 76 compresses the vapor thereby heating same to increase the efficiency of the stripping gas in vessel 34 and recover more liquid hydrocarbon from the bottoms effluent.

Condensate from condenser 64 is returned to accumulator 54 thru line 82. A liquid level controller 84 is connected with a liquid level sensing device 86 on accumulator 54 and operates valve 58 to permit flow of condensate hydrocarbon into the upper section of column 10 thru line 22 to serve as reflux.

A motor valve 88 and a condenser or cooler 90 are positioned in line 18 which takes off a product side stream, usually olefin monomer, as the recovered wash liquid of the process. Liquid level controller 92 is connected with liquid level sensing device 94 and with motor valve 88 to maintain a selected liquid level on a tray in the upper section of column 10.

The feed line to the process or apparatus is line 96 which may contain pump 98 if needed to provide the required inlet pressure in line 96. Usually, the stream in line 96 is at sufficient pressure as it comes from the polymer washing step of the process to permit introduction to line 24 without need of pump 98. Feed line 96 connects with line 24 upstream of reboiler 26 which passes the feed to column 10 thru the indirect heat exchange tubes 28 in reboiler 26. While it is preferred to pass all of the feed thru line 96, it is feasible to introduce a portion of the feed directly thru line 16 or thru an auxiliary feed line such as line 100. However, in most installations the prevention of polymer deposition is facilitated by passing all of the feed to the column thru line 96 and thru reboiler 26.

In the event additional olefin vapor is required in the stripping vessel 34, same may be introduced thru line 102. In the event excess olefin vapor is passing thru line 74, this excess may be passed thru line 104, under the impetus of pump 106 to any suitable use.

A typical application of the apparatus of the invention is in the recovery of propylene from a solution of soluble polypropylene in the propylene monomer. In such a process the feed stream is introduced at a temperature in the range of about 110–125° F. and the bottom stream temperature is in the range of 120–130° F., the difference in temperature being provided by heating exchanging the liquid in line 24 passing thru reboiler 26 with heat exchange fluid passed into the reboiler thru line 108 and withdrawn thru line 110. Pressure in the column is maintained at about 275 p.s.i.a. and the top column temperature is maintained at about 110–112° F. The operating variables necessary for separation of liquid olefins from soluble polymer therein are well known in the art and are not a part of the instant invention. Further details as to operating variables are therefore not set forth in detailed form herein.

The soluble polymer contained in the feed in stream 96 is recovered in line 36 after stripping a substantial proportion of monomer therefrom in both stripping vessel 34 and column 10, and the residual polymer containing unrecovered monomer is passed thru line 36 to suitable use or disposal not connected with the invention.

The introduction of the reboil liquid to the kettle section of the fractionator has been practiced for a substantial period of time and has been found to eliminate the foaming problem which existed prior to the introduction of the feed tangentially under ring 30. This practice also eliminated cavitation at pump 50. The pump is operating at a normal pump suction head of 3 feet and this is under the recommended value; however, the pump has continued to operate satisfactorily with introduction of the reboil liquid in accordance with the invention whereby foaming is substantially eliminated.

Certain modifications of the invention will become apparent to those skilled in the art and the illustrative details disclosed are not to be construed as imposing unnecessary limitations on the invention.

I claim:
1. Apparatus comprising in combination:
   (1) an upright cylindrical fractionating column having trays in an upper section and a kettle section, an overhead outlet, a side stream outlet, and a bottoms outlet;
   (2) common inlet means for reboil liquid and fresh feed to the column of (1) comprising a conduit entering the vertical wall of said column substantially horizontally and tangentially thereof substantially above the normal liquid level in said kettle section and below the lowermost tray in said upper section;
   (3) a horizontal annular plate below said lowermost tray and adjacent the upside of the inlet means of (2), providing a substantial central opening at the inner periphery of said plate for flow of vapors directly along the bottom of said plate and thence upwardly into said upper section;
   (4) a reboiler outside of said column;
   (5) an effluent line for kettle product leading from the bottoms outlet of (1);
   (6) conduit means connecting an intermediate section of the effluent line of (5) with the reboiler of (4) and said reboiler with the inlet means of (2); and
   (7) a fresh feed line connecting with conduit means (6) upstream of the reboiler for introducing fresh feed to said column in admixture with reboil liquid.

2. The apparatus of claim 1 wherein the annular plate of (3) has an outer diameter substantially that of the inner diameter of said column, abutting the inner wall thereof, and a width in the range of $\frac{1}{15}$ to $\frac{4}{15}$ of the inner diameter of said column.

3. The apparatus of claim 1 including:
   (8) a stripping vessel having an inlet for bottoms effluent connected with the downstream end of the effluent line of (5), a gas or vapor distributor in its lower section, an overhead outlet for vapor, and a bottoms outlet for stripped liquid;
   (9) a stripping gas supply line connected with the gas or vapor distributor of (8); and
   (10) conduit means connecting the overhead outlet of (8) with the feed inlet means of (2), said fresh feed inlet line connecting with the conduit means of (6) upstream of the reboiler of (4).

(References on following page)

References Cited

UNITED STATES PATENTS

| | | | |
|---|---|---|---|
| 2,510,548 | 6/1950 | Brunjes | 202—154 XR |
| 2,713,023 | 7/1955 | Irvine | 203—88 XR |
| 2,819,206 | 1/1958 | Evans et al. | 202—153 |
| 2,843,534 | 7/1958 | Harper | 203—88 |
| 3,080,300 | 3/1963 | Smith | 203—88 XR |
| 3,216,909 | 11/1965 | Bress | 203—75 XR |
| 3,257,372 | 6/1966 | Moon | 260—94.9 |

NORMAN YUDKOFF, *Primary Examiner.*

D. EDWARDS, *Assistant Examiner.*